United States Patent
Shah et al.

(10) Patent No.: US 7,058,299 B1
(45) Date of Patent: Jun. 6, 2006

(54) METHOD AND SYSTEM FOR OPTIMIZING A LASER SYSTEM

(75) Inventors: Saurin Shah, San Jose, CA (US); Chris Barnard, Sunnyvale, CA (US); Carl Paquet, San Jose, CA (US); Denis Zaccarin, Sunnyvale, CA (US); Mike Sieben, Alberta (CA)

(73) Assignee: CIENA Corporation, Linthicum, MD (US)

( * ) Notice: Subject to any disclaimer, the term of this patent is extended or adjusted under 35 U.S.C. 154(b) by 637 days.

(21) Appl. No.: 10/289,813

(22) Filed: Nov. 7, 2002

Related U.S. Application Data

(60) Provisional application No. 60/337,844, filed on Nov. 7, 2001.

(51) Int. Cl.
*H04B 10/08* (2006.01)
*H04B 17/00* (2006.01)

(52) U.S. Cl. .................... 398/27; 398/16; 398/25; 398/26; 398/38

(58) Field of Classification Search ............ 398/16, 398/23, 25–27, 38
See application file for complete search history.

(56) References Cited

U.S. PATENT DOCUMENTS 6,583,910 B1 * 6/2003 Satoh .................. 398/182

* cited by examiner

*Primary Examiner*—Jason Chan
*Assistant Examiner*—Nathan Curs
(74) *Attorney, Agent, or Firm*—Dougherty Clements; Bradley D. Crose; Tyler S. Brown

(57) ABSTRACT

A method for optimizing an optical transmitter is provided. According to one exemplary method, the optical transmitter is optimized by varying three transmitter parameters including the bias voltage, the crossing level and the peak-to-peak voltage. Once the respective optimal levels for the bias voltage, the crossing level and the peak-to-peak voltage are obtained, the optical transmitter is further checked to ensure that the optical transmitter is able to function properly within certain predetermined system parameters. The optical transmitter is also checked under two limiting scenarios to ensure that the optical transmitter is optimized against two predetermined lengths of optical fiber.

21 Claims, 6 Drawing Sheets

METHOD AND SYSTEM FOR OPTIMIZING A LASER SYSTEM

CROSS REFERENCE TO RELATED APPLICATION

The present application claims the benefit of priority under 35 U.S.C. § 119 from U.S. Provisional Patent Application Ser. No. 60/337,844, entitled "METHOD AND SYSTEM FOR OPTIMIZING A LASER SYSTEM" filed on Nov. 7, 2001, the disclosure of which is hereby incorporated by reference in its entirety for all purposes.

BACKGROUND OF THE INVENTION

The present invention relates generally to a laser system, and more specifically, to a method and system for optimizing a laser system.

As part of the manufacturing process, manufacturers of laser systems typically perform quality control or acceptance testing on a laser system before such system is shipped out from the manufacturing plant. Such quality control typically focuses on whether a laser system is functioning properly within certain minimal operating parameters. The primary concern of the manufacturers is to ensure that the laser systems being shipped out are operational.

A laser system may be used for many different purposes or applications. For some applications, crude performance by the laser system is sufficient, and the incremental benefits derived from optimizing the performance of the laser system are often marginal and not necessary. From a cost perspective, there is therefore little incentive for the manufacturers to optimize the performance of a laser system due to the many potentially different uses of the laser system. Hence, little to no attention is given to the level of performance of a laser system beyond the minimal operating parameters.

In some applications, however, the optimization of the laser system would be desirable. For example, a laser system may be optimized for use in connection with a specific type of optical fiber or receiver to enhance overall system performance. Since a laser system provides the light source which is used to generate the optical signals in an optical communication system, the performance of the laser system is important to the optical communication system in many different respects. For example, the performance of the laser system may affect the quality of the optical signals being generated. Even though a laser system may be functioning properly within its operating parameters, the quality of the optical signals may still be improved if the performance of the laser system is optimized.

Furthermore, the performance of a laser system may also affect the distance which the generated optical signals are able to travel. Improving the range of the generated optical signals reduces the need to install costly signal-enhancing equipment such as repeaters or optical amplifiers. Therefore, it would be desirable to provide a method and system which is capable of optimizing the performance of a laser system.

SUMMARY OF THE INVENTION

According to one exemplary method, an optical transmitter is optimized by varying three transmitter parameters including the bias voltage, the crossing level and the peak-to-peak voltage. More specifically, the bias voltage is first varied to achieve its optimal level, which is considered to occur when the performance of the optical transmitter falls within an acceptable range. The performance of the optical transmitter can be measured in a number of ways (for example, bit-error rate). Once determined, the optimal level for the bias voltage is maintained constant at its optimal level, and the crossing level is then varied to determine its optimal level. Similarly, once determined, the optimal level for crossing level is maintained constant. Next, with the bias voltage and the crossing level maintained at their respective optimal levels, the peak-to-peak voltage is varied to determine its optimal level. Optionally, where the optical transmitter is an integrated laser-modulator, the laser current can also be varied as an additional transmitter parameter to achieve its optimal level. The optimal level of the laser current is obtained and held constant before the optimal level for the bias voltage is determined.

Once the respective optimal levels for the bias voltage, the crossing level and the peak-to-peak voltage, and optionally, the laser current, are obtained, the optical transmitter is further checked to ensure that the optical transmitter is able to function properly within certain predetermined system parameters. The optical transmitter is also checked under two limiting scenarios to ensure that the optical transmitter is optimized against two predetermined lengths of optical fiber. The foregoing process with respect to determining the respective optimal levels of the bias voltage, the crossing level and the peak-to-peak voltage, and optionally, the laser current, and checking the viability of the optical transmitter can be repeated as appropriate to obtain more accurate measurements of the respective optimal levels of the transmitter parameters.

Furthermore, in some embodiments, the optical transmitter is directed to operate at the respective optimal levels of the bias voltage, the crossing level and the peak-to-peak voltage for an extended period of time. During this extended period of time, the performance of the optical transmitter is monitored to ensure that such performance is sustainable or otherwise remains within an acceptable performance level. If the performance is sustainable, then the respective optimal levels for the bias voltage, the crossing level and the peak-to-peak voltage are saved or recorded for subsequent use. With these recorded optimal levels available, the optical transmitter can be easily adjusted according to these optimal levels to achieve optimal performance during re-calibration or other conditions under which optimal performance need to be restored. On the other hand, if the performance is not sustainable during the extended period of time, the foregoing optimization process is repeated until the true optimal levels are obtained.

The optimization process as described above can be applied in a number of different situations. For example, this process can be used to restore performance of an optical transmitter in an optical network.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of various exemplary embodiments will now be described. An exemplary method embodiment of the present invention is used to optimize the performance of a long reach transmitter, such as an integrated laser-modulator including an electro-absorption modulator laser, which is used in connection with a transponder card. It should be understood that the long reach transmitter can also include, for example, a non-integrated laser-modulator (including an electro-absorption modulator that is not integrated with a laser) and a direct-mode laser. Based on the disclosure provided herein, a person of ordinary skill in the art will know how to apply the present invention to different types of optical equipment. Typically, the long reach transmitter is used to generate optical signals which are then transmitted over an optical fiber to a piece of wavelength division multiplexing (WDM) equipment. For optical signals that need to travel a long distance, an optical amplifier may be interposed in the signal path to maintain the signal strength.

Figure 1:
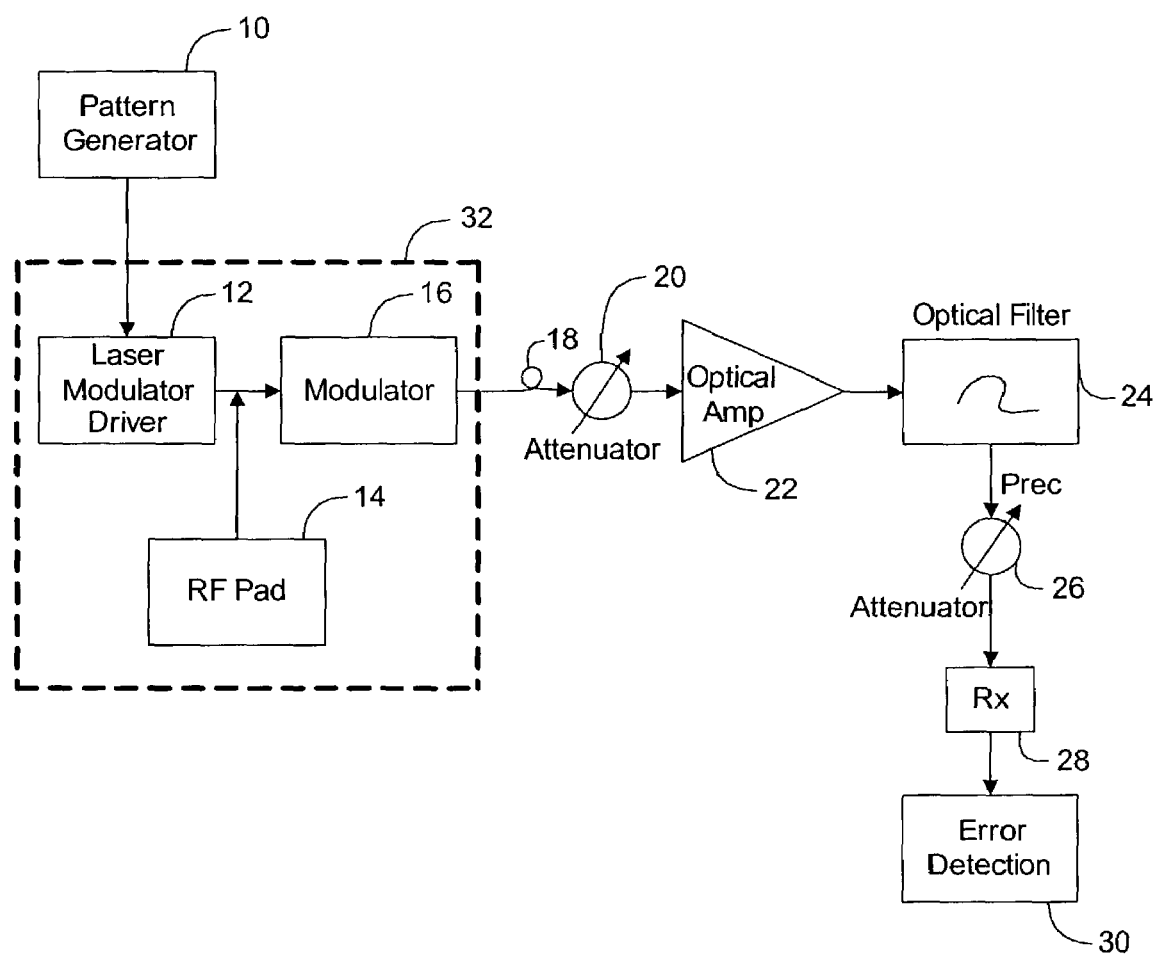
FIG. 1 is a simplified block diagram illustrating an arrangement used to optimize the performance of a long reach transmitter in accordance with the present invention.

FIG. 1 is a simplified block diagram showing an exemplary arrangement which is used to optimize the performance of the long reach transmitter in accordance with the present invention. The arrangement includes a pattern generator 10, a laser modulator driver 12, an RF pad 14, a modulator 16, an optical fiber 18, a first attenuator 20, an optical amplifier 22, an optical filter 24, a second attenuator 26, a reference receiver 28 and an error detection mechanism 30. The pattern generator 10 is coupled to the laser modulator driver 12 and is used to generate a test pattern which is fed to the laser modulator driver 12 for transmission. The laser modulator driver 12, in turn, is coupled to the modulator 16 via the RF pad 14. The RF pad 14 is used to attenuate the signals going into the modulator 16. Collectively, the laser modulator driver 12, the RF pad 14 and the modulator 16 constitute the long reach transmitter 32. It should be understood that while the present invention is described with reference to a long reach transmitter, the present invention can be applied to any type of optical transmitter. A person of ordinary skill in the art will know how to apply the present invention to optimize other types of optical transmitters.

The modulator 16 then transmits the test pattern (in the form of optical signals) over the optical fiber 18 to the first attenuator 20. In one exemplary embodiment, the optical fiber 18 is a NDSF fiber and has a length of eighty (80) km. It should be noted that the optical fiber type and length may vary depending on the optimization being performed. The first attenuator 20 is used to adjust the power of the incoming optical signals input to the optical amplifier 22. By adjusting the first attenuator 20, one can adjust the optical signal to noise ratio (OSNR) of signals going out from the optical amplifier 22. The optical signals from the optical amplifier 22 are passed to the optical filter 24. The optical filter 24 is used to simulate a WDM channel filter in front of a receiver in a WDM system. The output of the optical fiber 24 is then fed to the second attenuator 26 which adjusts the power of the optical signals before the optical signals are received by the reference receiver 28. The reference receiver 28 then relays the optical signals to the error detection mechanism 30. The error detection mechanism 30 recovers the transmitted test pattern from the optical signals. The error detection mechanism 30 then compares the transmitted test pattern with the original test pattern to determine whether any error has occurred during the transmission. The error detection mechanism 30 may use a number of different methods to measure errors including, for example, a bit-error-rate test set, a SONET test set, parity check, and forward error correction algorithms such as the Reed-Solomon algorithm. In an exemplary implementation, the control logic used by the error detection mechanism 30 is implemented using computer software or programming instructions. Alternatively, hardware may also be used to implement the error detection mechanism 30. A person of ordinary skill in the art will know of other ways and/or methods to implement the error detection mechanism 30 using software, hardware or a combination of both.

Figure 2:
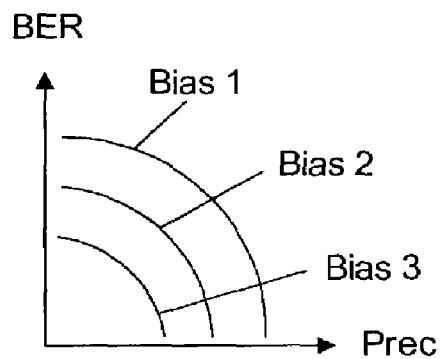
FIG. 2 is a diagram illustrating the bit-error rate as a function of the received power of optical signals at a reference receiver.

FIG. 2 is a diagram illustrating the bit-error rate as a function of the received power of the optical signals at the reference receiver 28. As shown in FIG. 2, the bit-error rate varies with the received power of the optical signals; more specifically, the bit-error rate decreases as the received power of the optical signals is increased. Hence, in order to optimize the transmitter 32 using the associated transmitter parameters, the first attenuator 20 is fixed to maintain the received OSNR of the optical signals at a constant level. The second attenuator 26 is used to help maintain the constant received power of the optical signals. By fixing the first and second attenuators 20 and 26, the associated transmitter parameters can then be varied to reduce the bit-error rate thereby optimizing the performance of the transmitter 32. For example, as shown in FIG. 2, at a given received power level, the bit-error rate can be adjusted based on the bias voltage of the transmitter 32. How the associated transmitter parameters are used to optimize the performance of the transmitter 32 will be further described below.

For purposes of optimizing the transmitter 32, the received power of the optical signals is maintained at a sufficiently low level that the bit-error rate is noticeable. By maintaining the bit-error rate at a noticeable level, the effectiveness of the adjustments made to the transmitter parameters to optimize the transmitter performance can be made more verifiable. In contrast, if the received power of the optical signals is maintained at such a high level that the bit-error rate is very low to begin with, the effectiveness of the adjustments made to the transmitter parameters may be made more difficult to ascertain. In addition, the length of the optical fiber 18 and the signal-to-noise ratio of the optical signals are chosen to provide a limiting scenario. Hence, the transmitter 32 can be optimized under the limiting scenario.

Figure 3:
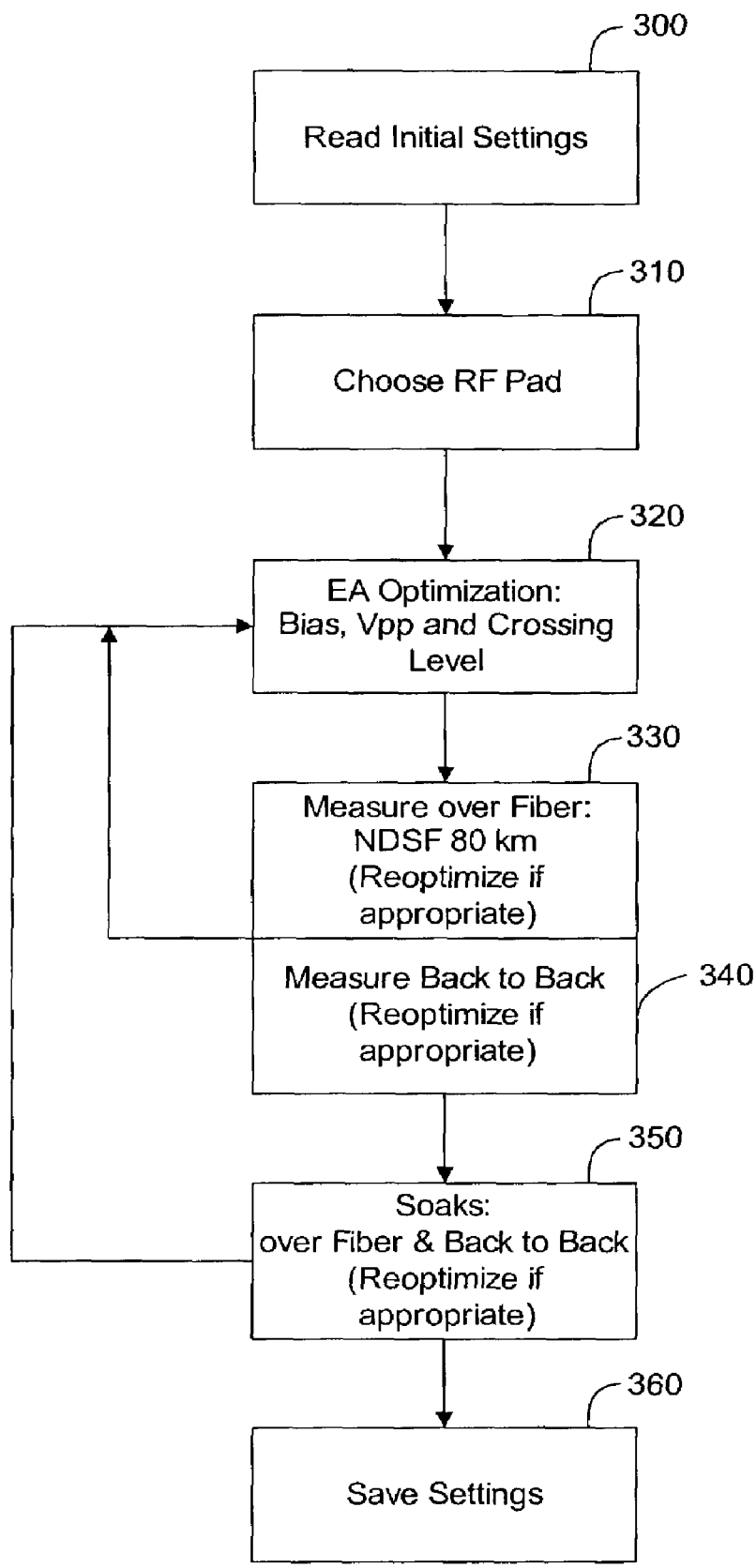
FIG. 3 is a flow diagram illustrating an exemplary method of the present invention used in optimizing a transmitter.

FIG. 3 is a flow diagram illustrating an exemplary method of the present invention used in optimizing the transmitter 32. At step 300, the initial settings and/or parameters of the transmitter 32 are obtained (for example having been provided by the manufacturer or vendor of the transmitter 32 in a data sheet). Typically, these initial settings and/or parameters are intended to provide guidance to achieve only minimal, acceptable performance. Nonetheless, these initial settings and/or parameters provide a starting point for the optimization process.

At step 310, the appropriate RF pad 14 is chosen. In general, the transmitter 32 has a limited dynamic operating range. In order for the modulator 16 to function properly, the incoming signals from the laser modulator driver 12 need to be attenuated so that the incoming signals fall into the dynamic operating range of the modulator 16. A person of ordinary skill in the art will know how to properly select the appropriate RF pad 14. Similarly, as described above, the initial bias voltage and peak-to-peak voltage are selected from the vendor data sheet. In the event that the peak-to-peak voltage is run out of range during the optimization process, either a larger or a smaller RF pad is inserted and the optimization process starts again from step 320.

At step 320, three transmitter parameters, namely, the bias voltage, the crossing level and the peak-to-peak voltage (Vpp), are varied in sequential order. These three transmitter parameters are varied subject to a number of optimization constraints. For example, these optimization constraints include (1) an extinction ratio larger than 8.2 dB (ER>8.2 dB), (2) an optical crossing larger than 48% but less than 54% (48%<OCL<54%), and (3) a transmitter output power larger than −2.0 dBm but less than 4.0 dBm (−2.0<Po<4.0 dBm). When each of the three transmitter parameters is varied, all the optimization constraints are to be observed and are not to be violated. Optionally (not shown), where the transmitter 32 is an integrated laser-modulator, the laser current can also be varied as an additional transmitter parameter to achieve its optimal level. Similarly, the initial value for the laser current is typically provided by the manufacturer or vendor of the transmitter 32 and is usually intended to provide guidance to achieve only minimal, acceptable performance. The laser current can be varied to achieve optimal transmitter performance. More specifically, the laser current affects the characteristics or properties of the input voltage to output power transfer function of the transmitter 32. When appropriate, the optimal level of the laser current is obtained and held constant before the optimal level for the bias voltage is determined as described below.

Figure 4:
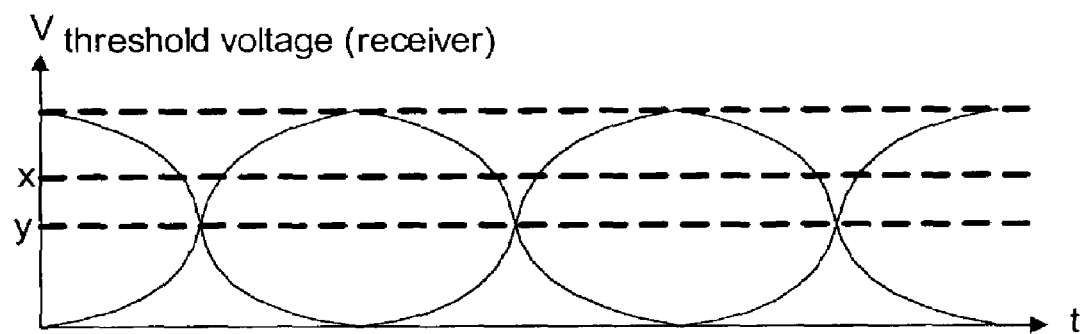
FIG. 4 is a diagram illustrating how a threshold voltage affects the bit-error rate.
Figure 5A:
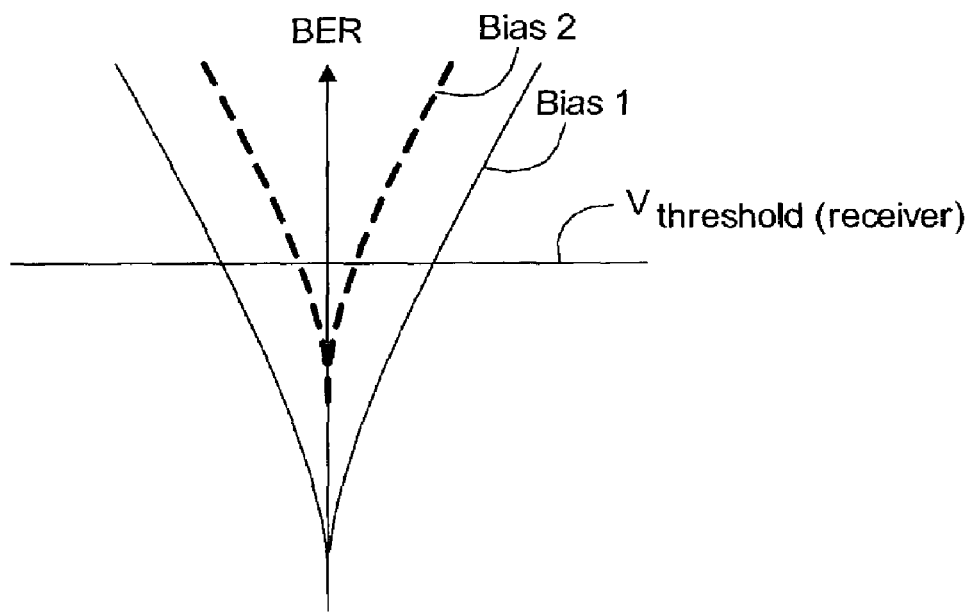
FIGS. 5A and 5B are diagrams illustrating the bit-error rate as a function of the threshold voltage at a receiver.
Figure 5B:
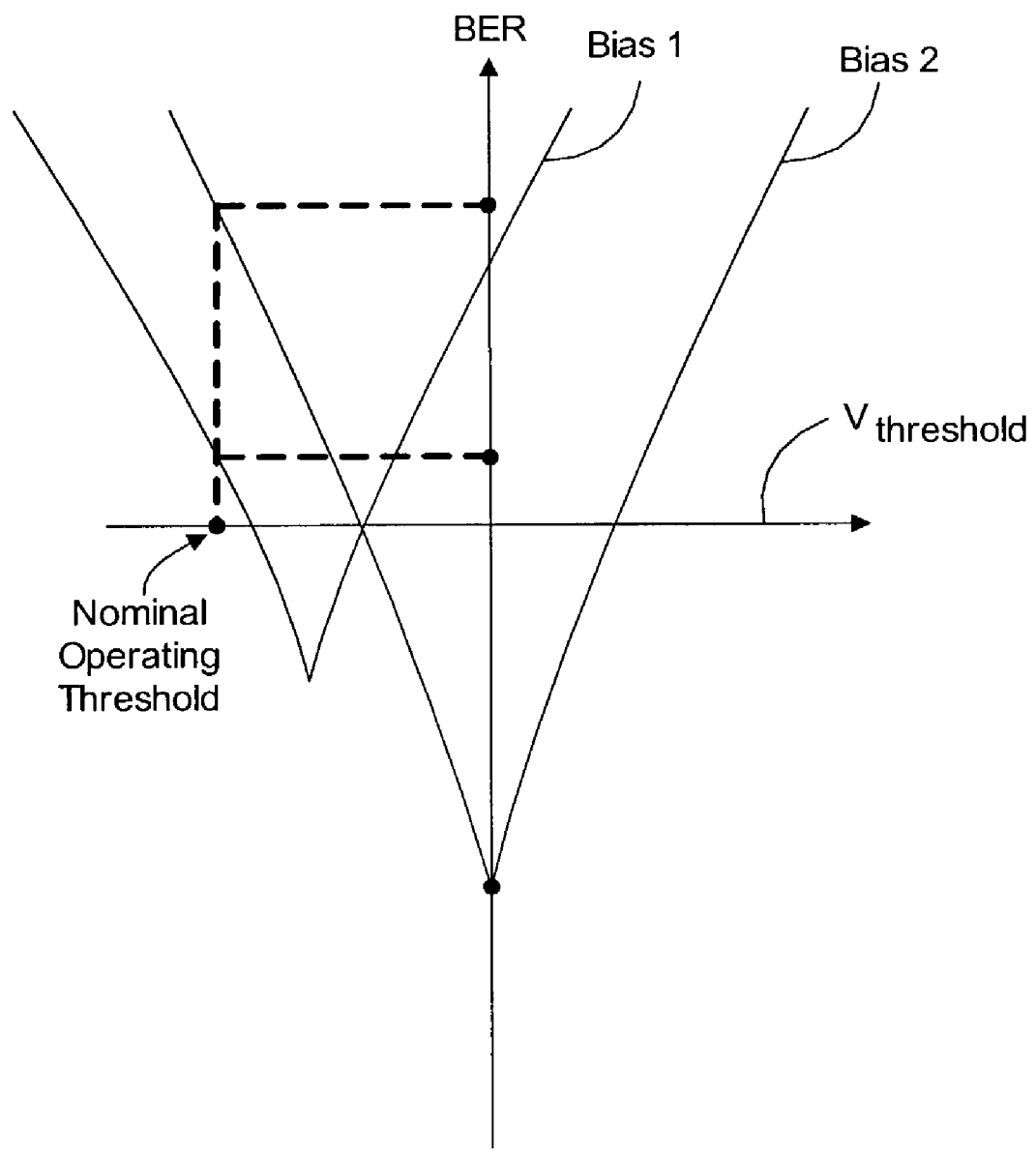

The bias voltage is varied to obtain the optimal bit-error rate (or other quantity that may be used to measure the level of performance of the transmitter 32). It should be noted that the bit-error rate is only one of many metrics that can be used to measure the level of performance of the transmitter 32. A person of ordinary skill in the art will know of other ways and/or methods to measure the performance of a transmitter. The value of the bit-error rate is inversely proportional to the level of performance, i.e., the lower the bit-error rate, the higher the level of performance. The bias voltage that produces the optimal bit-error rate is then kept at that optimal level. FIGS. 4, 5A, and 5B illustrate how the bias voltage is used to optimize the performance of the transmitter 32. FIG. 4 shows how the threshold voltage at the reference receiver 28 can be used to influence the bit-error rate. As shown in FIG. 4, the threshold voltage defines the minimum level for a signal to qualify as a logic state "high" or "1". Adjusting the threshold voltage to a higher level would render it more difficult for a signal to qualify as a logic state "high" or "1". For example, as shown in FIG. 4, if the threshold voltage is raised from level y to level x, then signals with voltage levels that fall between level x and level y no longer qualify as a logic state "high" or "1". Since the raised threshold voltage makes it more difficult for a signal to qualify as a logic state "high" or "1", more signals may be interpreted as being in error thereby increasing the bit-error rate. Typically, however, the threshold voltage for the reference receiver 28 may not be freely adjustable.

FIG. 5A is a diagram showing the bit-error rate vs. the threshold voltage. As shown in FIG. 5A, for a given threshold voltage, receiver power and ONSR, the bias voltage can be used to shift the curve to obtain the desired bit-error rate. That is, with a fixed threshold voltage for the reference receiver 28, the bias voltage of the transmitter 32 is adjusted to minimize the extrapolated bit-error rate at the nominal receiver operating threshold. If the threshold voltage for the reference receiver 28 is variable, then the bias voltage of the transmitter 32 is adjusted to minimize the extrapolated bit-error rate globally, as shown in FIG. 5B.

Then, with the bias voltage maintained at an optimal level, the crossing level is varied to obtain an even better bit-error rate, if possible. The crossing level that produces the latest best bit-error rate is then also kept at an optimal level. With the bias voltage and the crossing level kept at their respective optimal levels, the Vpp is then varied to further obtain an even better bit-error rate, if possible. The three transmitter parameters are preferably varied in the sequential order described above because the bias voltage, the crossing level and the Vpp respectively have decreasingly less effect on the performance of the transmitter 32. During adjustment of the Vpp, if optimum voltage is less than or greater than the allowed range with the RF pad 14 chosen, then the RF pad 14 has to be changed and the optimization process has to be repeated starting from step 320. Hence, at the end of step 320, the respective optimal levels for the bias voltage, the crossing level and the Vpp are obtained.

Next, even though the optimal levels for the bias voltage, the crossing level and the Vpp are obtained which collectively allow the best bit-error rate to be achieved, the transmitter 32 still needs to be checked to ensure that the transmitter 32 is operating within certain predetermined system parameters. In other words, the transmitter 32 by itself may be optimized but it can still fail to meet the predetermined system parameters when the transmitter 32 is incorporated into or used within a system. The predetermined system parameters which the transmitter 32 has to meet depend on each system. According to the exemplary method, the transmitter 32 is tested against the reference receiver 28 that has the same characteristics as a receiver in the network or system.

At step 330, the transmitter 32 is tested under one limiting scenario in which the length of the optical fiber 18 is eighty (80) km. The length of eighty (80) km is an industry standard, although other lengths may be used. The transmitter 32 is tested using this optical fiber length to ensure that the transmitter 32 continues to function properly at that optical fiber length and that certain predetermined system parameters are observed during operation. Under this scenario, the predetermined system parameters include, for example, (1) OSNR 25 dB in 0.2 nm, (2) Po<3 dBm, and (3) sensitivity (1e-11)<−14.5 dBm. If the transmitter 32 fails to comply with the predetermined system parameters, then the transmitter 32 is re-optimized at step 320.

After the transmitter 32 passes the first limiting scenario, at step 340, the transmitter 32 is also tested under a second limiting scenario in which the length of the optical fiber 18 is nominally zero (0) km. The transmitter 32 is tested with an optical fiber length of nominally zero (0) km to ensure that the transmitter 32 continues to function properly under this condition and that certain predetermined system parameters are observed during operation. Under this scenario, the predetermined system parameters include, for example, (1) OSNR 25 dB in 0.2 nm, (2) sensitivity (1e-11)<−16.0 dBm, and (3) dispersion penalty<3 dB. Likewise, if the transmitter 32 fails to comply with the predetermined system parameters, then the transmitter 32 is re-optimized at step 320.

The transmitter 32 is tested under the two limiting scenarios as described above to ensure that the transmitter 32 is not optimized in such a way that one scenario is favored to the detriment of the other. Furthermore, it should be noted that the order of testing the transmitter 32 using the two limiting scenarios is not important. One limiting scenario can be tested before the other, or vice versa. The foregoing process with respect to determining the respective optimal levels of the bias voltage, the crossing level and the peak-to-peak voltage, and optionally, the laser current, and checking the viability of the transmitter 32 can be repeated as appropriate to obtain more accurate measurements of the respective optimal levels of the transmitter parameters.

At step 350, the steps 330 and 340 are repeated for a predetermined period of time to verify that the best bit-error rate can be sustained and that the predetermined system parameters are observed. For example, the steps 330 and 340 can be repeated for a period of fifteen (15) minutes at a receiver power level of −13 dBm. After step 350 is concluded, the three transmitter parameters, i.e., the bias voltage, the crossing level and the Vpp, and optionally, an additional transmitter parameter, i.e., the laser current, associated with the transmitter 32 are saved for future reference at step 360. The transmitter parameters can be saved, for example, in a non-volatile memory device associated with the transmitter 32 so that upon power-up, these parameters are available to cause the transmitter 32 to reach an optimized state. If the transmitter 32 fails during the predetermined period of time, then the optimization process and the check against predetermined system parameters are repeated at steps 320–340.

It should be understood that the exemplary method of the present invention can be implemented using software or hardware or a combination of both.

The optimization process as described above in connection with FIG. 3 can be repeated with different types of optical fibers or equipment configurations (e.g., including an optical fiber, a repeater, an optical amplifier and a receiver) to be used with the transmitter 32. For example, the transmitter 32 can be optimized against a positive dispersion fiber and a negative dispersion fiber separately. The respective optimized transmitter parameters for the positive and the negative fiber can then be stored in a non-volatile memory associated with the transmitter 32. During subsequent operation, depending on the type of optical fiber to be used with the transmitter 32, the appropriate optimized transmitter parameters can be selected to provide optimized performance. For example, if the transmitter 32 is to be used with a positive dispersion fiber, then the transmitter 32 is configured with the transmitter parameters associated with that type of fiber. Likewise, the transmitter 32 can be optimized against a particular equipment configuration including a specific type of optical fiber and optical component.

The optimization process as described in connection with FIG. 3 is useful in a manufacturing setting where the transmitter 32 is to be optimized against optical components with known characteristics. The optimization process is similarly useful in a field setting where the transmitter 32 is to be optimized against optical components which are located in the field or remote locations, the characteristics of which may or may not be known.

Figure 6:
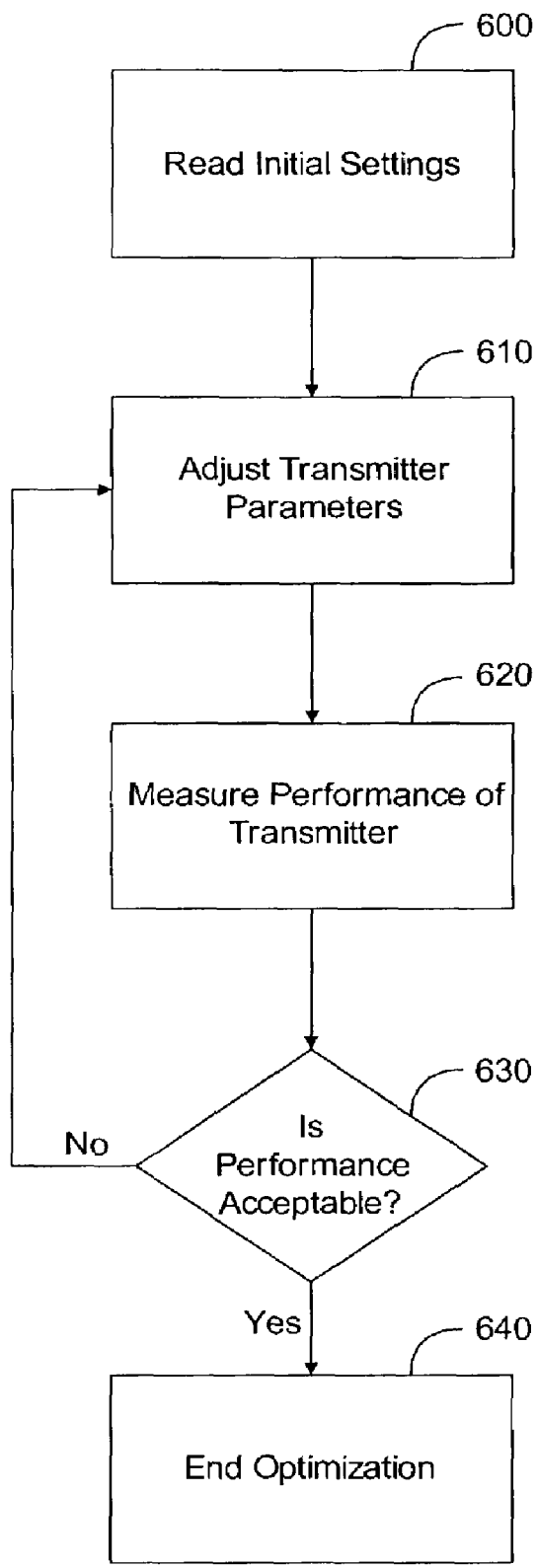
FIG. 6 is a flow diagram illustrating an exemplary method of the present invention used in optimizing a transmitter against optical components located in the field.

FIG. 6 is a flow diagram illustrating an exemplary method of the present invention used in optimizing the transmitter 32 against optical components located in the field. Referring to FIG. 6, at step 600, the initial settings and/or parameters of the transmitter 32 are obtained. Likewise, these initial settings and/or parameters are usually provided by the manufacturer or vendor of the transmitter 32 in a data sheet. Similar to step 320, at step 610, the transmitter parameters, including the bias voltage, the crossing level and the peak-to-peak voltage, are adjusted to achieve their respective optimal levels. That is, as described above, the bias voltage, the crossing level and the peak-to-peak voltage are each varied or adjusted in sequential order to achieved their respective optimal levels. At step 620, the performance of the transmitter 32 is measured. At step 630, the performance of the transmitter 32 is evaluated. If the performance is not within an acceptable range, the transmitter parameters are then adjusted again at step 610. The foregoing process is repeated until the performance of the transmitter 32 is found to be within an acceptable range.

The exemplary method of the present invention as described above in connection with FIG. 6 can be used in a number of applications. For example, in one application, the exemplary method is used to optimize a transmitter against a receiver in an optical network.

Figure 7:
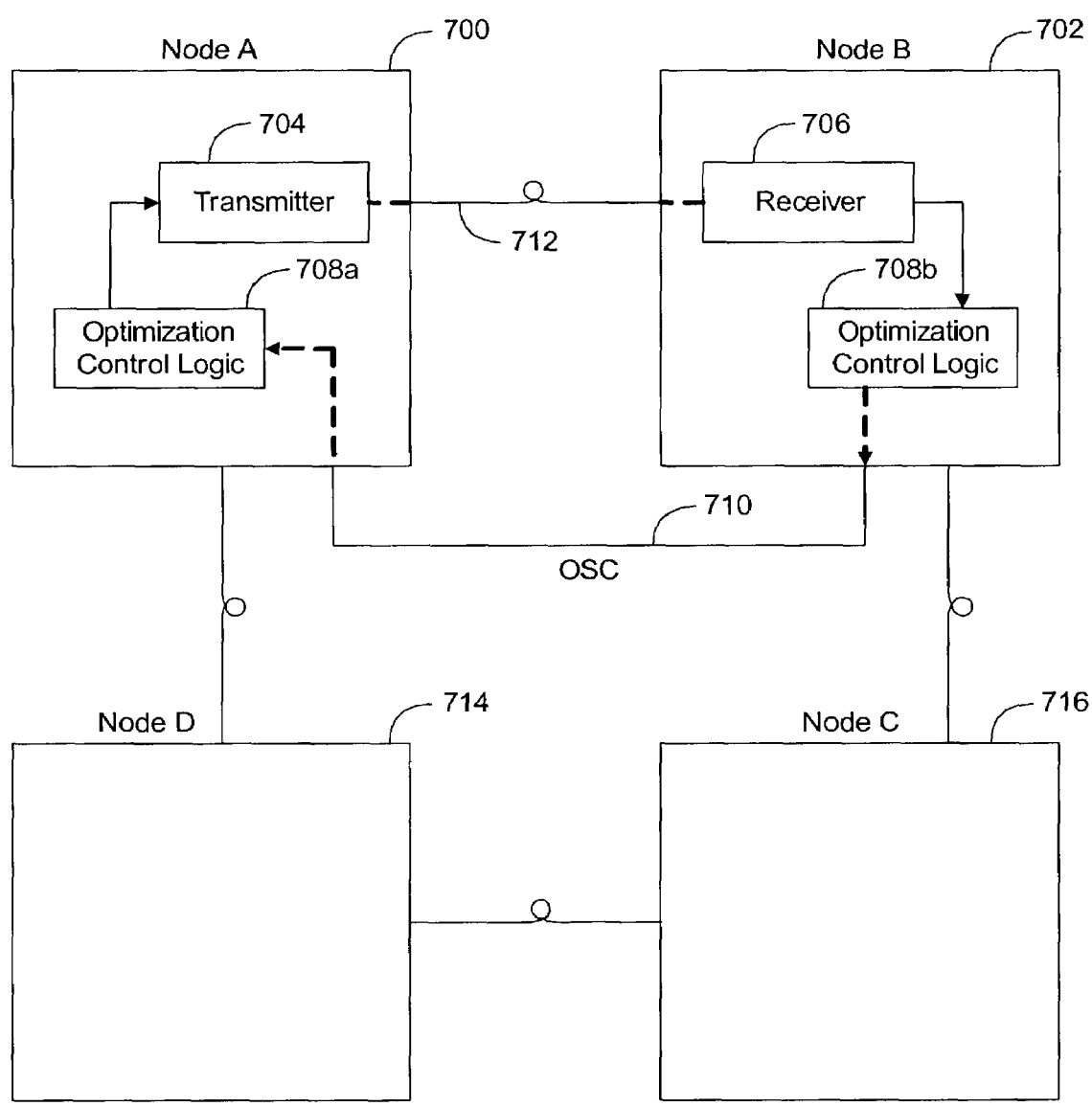
FIG. 7 is a simplified block diagram illustrating how a portion of an optical network can be optimized using an exemplary method of the present invention.

FIG. 7 illustrates a portion of an optical network which can be optimized using an exemplary method of the present invention. The optical network includes node A 700, node B 702, node C 716 and node D 714. Node A 700 and node B 702 are coupled to one another by an optical fiber 712. It should be noted that there may be other optical equipment (not shown), such as repeaters and optical amplifiers, that are coupled between node A 700 and node B 702 for enhancing the optical signals transmitted on the optical fiber 712. Node A 700 includes a transmitter 704 which is to be optimized against a receiver 706 associated with Node B 702. The optimization control logic 708*a* and 708*b*, including the error detection mechanism, is distributed on both Node A 700 and Node B 702. Node A 700 and Node B 702 are also able to communicate with one another via a separate communication channel, such as an "optical supervisory channel" (OSC) 710. For illustrative purposes, only node A 700 and node B 702 are discussed. However, it should be understood that the discussion pertaining to node A 700 and node B 702 is equally applicable to any other pair of nodes in the optical network. It should also be understood that the nodes depicted in FIG. 7 may lie in two separate subnetworks within an optical network, so that the nodes may be in separate interconnected rings or in a mesh network that are coupled together by optical fibers.

The transmitter 704 is optimized as follows. Optimization control logic 708*a* causes a test pattern to be generated by a test generator (not shown). The test pattern is then transmitted by the transmitter 704 via the optical fiber 712 to the receiver 706. At the same time, the test pattern is also provided to the optimization control logic 708*b* via the OSC 710. The receiver 706 then forwards the received test pattern to the optimization control logic 708*b* and the error detection mechanism. The received test pattern is then compared to the original test pattern to determine the performance of the transmitter 704. If the performance results are unacceptable, the optimization control logic 708*b* then informs its counterpart 708*a* located in Node A 700. The optimization control logic 708*a*, in turn, adjusts the transmitter parameters, including the bias voltage, the crossing level and the peak-to-peak voltage, as described above. After the transmitter parameters have been adjusted, the transmitter 704 transmits the test pattern to the receiver 706 again. The performance of the transmitter 704 is again evaluated by the optimization control logic 708b and the error detection mechanism. The foregoing process is repeated until the performance of the transmitter 704 falls within an acceptable level.

While the foregoing description describes the error detection mechanism as being associated with Node B 702, it should be understood that the error detection mechanism can also be associated with Node A 700. In an alternative implementation, the error detection mechanism is located in Node A 700. The received test pattern is transmitted back to Node A 700 via the OSC 710 and the performance of the transmitter 704 is evaluated at Node A 700. Furthermore, it should also be noted that the optimization control logic 708a,b need not be distributed as described above but can be located in one location. Based on the disclosure provided herein, it should be clear to a person of ordinary skill in the art how the optimization control logic 708a,b and the error detection mechanism can be implemented.

The foregoing optimization process, as described in connection with FIG. 7, can be performed in different types of situations. In one situation, in-service optimization (i.e., optimization performed while the transmitter 704 is operating under normal conditions) can be performed periodically to ensure that the transmitter 704 is operating within acceptable levels. In another situation, optimization can also be performed after system upgrade or maintenance to re-optimize the transmitter 704 against other system components.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for optimizing an optical transmitter, comprising:
    varying a plurality of transmitter parameters associated with the optical transmitter in sequential order to obtain their respective optimal levels, wherein the plurality of transmitter parameters include a bias voltage, a crossing level and a peak-to-peak voltage, wherein the respective optimal levels of the plurality of transmitter parameters are obtained based on an acceptable level of a performance metric associated with the optical transmitter;
    varying a bias voltage associated with the optical transmitter to determine its optimal level;
    with the bias voltage maintained at its optimal level, varying a crossing level associated with the optical transmitter to determine its optimal level; and
    with the bias voltage and the crossing level maintained at their respective optimal levels, varying a peak-to-peak voltage associated with the optical transmitter to determine its optimal level;
    wherein the respective optimal levels of the bias voltage, the crossing level and the peak-to-peak voltage are determined based on an acceptable level of a bit-error rate associated with the optical transmitter; and
    upon obtaining the respective optimal levels for the plurality of transmitter parameters, checking the optical transmitter to ensure that the optical transmitter is able to function properly within a plurality of system parameters.

2. The method according to claim 1 further comprising:
    when varying the plurality of transmitter parameters, maintaining a plurality of optimization constraints within their respective acceptable levels.

3. The method according to claim 2 wherein the plurality of optimization constraints include an extinction ratio, an optical crossing, and an output power.

4. The method according to claim 1 further comprising:
    operating the optical transmitter at the respective optimal levels of the plurality of transmitter parameters for an extended period of time; and
    monitoring the performance of the optical transmitter during the extended period of time to ensure that the performance of the optical transmitter remains within an acceptable performance level.

5. The method according to claim 4 further comprising:
    if the performance of the optical transmitter remains within the acceptable performance level for the extended period of time, recording the respective optimal levels of the plurality of transmitter parameters for subsequent use.

6. The method according to claim 4 further comprising:
    if the performance of the optical transmitter does not remain within the acceptable performance level for the extended period of time, repeating the steps of varying the plurality of transmitter parameters and then checking the optical transmitter.

7. The method according to claim 1 wherein the optical transmitter is optimized against an optical fiber having a predetermined length.

8. The method according to claim 1 wherein the optical transmitter is an integrated laser-modulator and the plurality of transmitter parameters include a laser current.

9. The method according to claim 1 wherein the plurality of system parameters include an optical signal to noise ratio, a sensitivity level and a dispersion penalty.

10. The method according to claim 1 wherein the performance metric associated with the optical transmitter is a bit-error rate.

11. The method according to claim 1 wherein the optical transmitter is an integrated laser-modulator or a non-integrated laser-modulator.

12. The method according to claim 1 further comprising:
    when varying the bias voltage, the crossing level and the peak-to-peak voltage to determine their respective optimal levels, maintaining one or more optimization constraints within their respective acceptable levels.

13. The method according to claim 12 wherein the one or more optimization constraints include an extinction ratio, an optical crossing, and an output power.

14. The method according to claim 1, wherein the optical transmitter is an integrated laser-modulator and the plurality of transmitter parameters include a laser current and wherein varying the plurality of transmitter parameters further comprises:
    varying the laser current to determine its optimal level and maintaining the laser current at its optimal level before varying the bias voltage.

15. The method according to claim 1, further comprising:
    supplying a test pattern to the optical transmitter;
    using the optical transmitter to transmit the test pattern to a reference receiver via an optical fiber having a predetermined length; and comparing the test pattern supplied to the optical transmitter to the test pattern received by the reference receiver to determine a bit-error rate associated with the optical transmitter.

16. An optical optimization system comprising:

an optical transmitter configured to transmit a plurality of optical signals, the optical transmitter having associated therewith a plurality of transmitter parameters including a bias voltage, a crossing level, and a peak-to-peak voltage;

a reference receiver configured to receive the plurality of optical signals from the optical transmitter;

an optical fiber configured to transmit the plurality of optical signals from the optical transmitter to the reference receiver, the optical fiber having a predetermined length;

an error detection mechanism configured to determine a bit-error rate associated with the optical transmitter based on the plurality of optical signals received by the reference receiver; and control logic configured to adjust the plurality of transmitter parameters in sequential order so as to achieve a level of the bit-error rate that meets an acceptable performance level;

wherein the control logic is configured to perform the following:

vary the bias voltage to determine its optimal level;

with the bias voltage maintained at its optimal level, vary the crossing level to determine its optimal level; and with the bias voltage and the crossing level maintained at their optimal levels, vary the peak-to-peak voltage to determine its optimal level;

wherein the respective optimal levels of the bias voltage, the crossing level and the peak-to-peak voltage collectively result in the level of the bit-error rate meeting the acceptable performance level.

17. The system of claim 16 wherein the control logic is further configured to maintain one or more optimization constraints within their respective acceptable levels when the bias voltage, the crossing level and the peak-to-peak voltage are varied to determine their respective optimal levels.

18. The system of claim 17 wherein the one or more optimization constraints include an extinction ratio, an optical crossing, and an output power.

19. The system of claim 16 wherein the control logic is further configured to direct the optical transmitter to operate at the respective optimal levels of the bias voltage, the crossing level and the peak-to-peak voltage for an extended period of time and determine whether the level of the bit-error rate of the optical transmitter remains within the acceptable performance level during the extended period of time; and wherein the control logic is further configured to record the respective optimal levels of the bias voltage, the crossing level and the peak-to-peak voltage for subsequent use, if the level of the bit-error rate of the optical transmitter remains within the acceptable performance level during the extended period of time.

20. The system of claim 16 wherein the control logic is further configured to determine whether the optical transmitter is able to function properly within one or more system parameters when operating at the respective optimal levels of the bias voltage, the crossing level and the peak-to-peak voltage.

21. The system of claim 20 wherein the one or more system parameters include an optical signal to noise ratio, a sensitivity level and a dispersion penalty.

* * * * *